(12) United States Patent
Yamada

(10) Patent No.: US 8,089,599 B2
(45) Date of Patent: Jan. 3, 2012

(54) ELECTRO-OPTICAL DEVICE AND ELECTRONIC APPARATUS

(75) Inventor: Hiroko Yamada, Suwa-gun (JP)

(73) Assignee: Seiko Epson Corporation, Tokyo (JP)

( * ) Notice: Subject to any disclaimer, the term of this patent is extended or adjusted under 35 U.S.C. 154(b) by 345 days.

(21) Appl. No.: 12/367,320

(22) Filed: Feb. 6, 2009

(65) Prior Publication Data

US 2009/0195722 A1   Aug. 6, 2009

(30) Foreign Application Priority Data

Feb. 6, 2008   (JP) ................... 2008-026443

(51) Int. Cl.
*G02F 1/1345* (2006.01)
(52) U.S. Cl. ........................................ 349/149
(58) Field of Classification Search .......... 349/40, 349/139, 149–152
See application file for complete search history.

(56) References Cited

U.S. PATENT DOCUMENTS 5,422,293 A * 6/1995 Konya ............................ 438/155
6,767,772 B2 * 7/2004 Takenaka ...................... 438/149

FOREIGN PATENT DOCUMENTS

| JP | 06-202149 | 7/1994 |
| JP | 07-131185 | 5/1995 |
| JP | 2001-339065 | 12/2001 |
| JP | 2005-309003 | 11/2005 |

* cited by examiner

*Primary Examiner* — Dung T. Nguyen
(74) *Attorney, Agent, or Firm* — Maschoff Gilmore & Israelsen

(57) ABSTRACT

An electro-optical device includes a short-circuit wire provided in a peripheral area surrounding a pixel area in which pixel electrodes are provided. The short-circuit wire includes a main portion that short-circuits scanning lines with each other and an extending portion that extends from the main portion in such a manner as to intersect data lines. A wire supplied with a predetermined potential in the peripheral area is electrically connected to the extending portion.

4 Claims, 4 Drawing Sheets

ELECTRO-OPTICAL DEVICE AND ELECTRONIC APPARATUS

BACKGROUND

1. Technical Field

The present invention relates to electro-optical devices, such as liquid crystal display devices, and electronic apparatuses, such as liquid crystal projectors, including the electro-optical devices.

2. Related Art

There is an exemplary electro-optical device disclosed in JP-A-2001-339065. This electro-optical device is manufactured in such a manner that, after a short-circuit wire is formed, cutting of the short-circuit wire and formation of data lines are performed simultaneously. The short-circuit wire is provided for preventing damage to thin-film transistors (TFTs) brought by static electricity generated during the manufacturing process.

There is another exemplary electro-optical device disclosed in JP-A-2005-309003. In this electro-optical device, an electrostatic protection circuit that suppresses the occurrence of overvoltage of an image-signal wire is provided on a substrate at each position where a constant-potential wire and the image-signal wire intersect each other when seen in a direction perpendicular to the surface of the substrate. A major feature of this device is that the image-signal wire is electrically connected to a first terminal of a switching element in the electrostatic protection circuit, and the constant-potential wire is electrically connected to a second terminal of the switching element.

The electro-optical device disclosed in JP-A-2001-339065, however, has a technical problem in that unintentional capacitive coupling may occur because the short-circuit wire has portions thereof being not electrically connected to any other wires, that is, the portions of the short-circuit wire are in a so-called floating state. Particularly, if any unintentional capacitive coupling occurs between the floating portions of the short-circuit wire and data lines that supply image signals, display failure may occur. On the other hand, the electro-optical device disclosed in JP-A-2005-309003 has another technical problem in that it is difficult to prevent damage to TFTs brought by static electricity generated during the process of manufacturing the electro-optical device.

SUMMARY

An advantage of some aspects of the invention is that it provides an electro-optical device in which the occurrence of unintentional capacitive coupling due to cut portions of a short-circuit wire can be suppressed, and an electronic apparatus including such an electro-optical device.

According to a first aspect of the invention, an electro-optical device includes, on a substrate, a plurality of scanning lines; a plurality of data lines intersecting the scanning lines; a plurality of pixel electrodes provided in correspondence with intersections of the scanning lines and the data lines; a short-circuit wire provided in a peripheral area surrounding a pixel area in which the pixel electrodes are provided, the short-circuit wire including a main portion that short-circuits the scanning lines with each other in a manufacturing process and an extending portion that extends from the main portion in such a manner as to intersect the data lines; and a constant-potential wire supplied with a predetermined potential and electrically connected to the extending portion.

In the electro-optical device according to the first aspect of the invention, the scanning lines and the data lines intersect each other on the substrate, such as a quartz substrate, and the pixel electrodes are provided in correspondence with intersections of the scanning lines and the data lines. The short-circuit wire is provided in the peripheral area surrounding the pixel area in which the pixel electrodes are provided, and includes the main portion that short-circuits the scanning lines with each other in the process of manufacturing the electro-optical device and the extending portion that extends from the main portion in such a manner as to intersect the data lines. The "pixel area" denotes the entirety of an area in which the pixels are arranged two-dimensionally, not an area occupied by each of the pixels, and typically corresponds to an "image display area" or a "display area". In the pixel area, a plurality of pixel electrodes are provided in a matrix pattern, for example.

In a typical manufacturing process, the short-circuit wire is provided in the same layer as the scanning lines. Further, when the data lines are formed in the manufacturing process, for example, electrical connection between the short-circuit wire and the scanning lines and electrical connection between the main portion and the extending portion of the short-circuit wire are cut simultaneously. In this context, to "short-circuit the scanning lines with each other in a manufacturing process" means that the scanning lines are electrically connected to each other temporarily in the manufacturing process, but the short-circuit wire and the scanning lines are not electrically connected to each other in the electro-optical device obtained as a finished product.

The constant-potential wire is supplied with a predetermined potential and is electrically connected to the extending portion of the short-circuit wire. The "predetermined potential" in the first aspect of the invention means a potential that is constant at least during each of predetermined periods, regardless of the information contained in image signals to be supplied to the data lines. For example, like an earthing potential, i.e., a ground potential, the "predetermined potential" may be a potential that is completely fixed at a certain level with respect to the time axis. Alternatively, like a common potential, i.e., a counter-electrode potential, the "predetermined potential" may be a potential that is fixed at respective levels for a plurality of periods with respect to the time axis. Specifically, the potential may be fixed at a first level in each of odd field-time periods of the image signal, and at a second level in each of even field-time periods, for example.

According to a study made by the present inventor, since cut portions of the short-circuit wire are not electrically connected to any other wires, the cut portions may trigger unintentional capacitive coupling. The study also shows that, particularly in a case where the cut portions of the short-circuit wire intersect the data lines, problems including nonuniformity between lines may occur, resulting in deterioration of image quality.

Hence, in the first aspect of the invention, the extending portion of the short-circuit wire and the constant-potential wire are electrically connected to each other. This determines the potential of the extending portion, whereby the occurrence of unintentional capacitive coupling can be suppressed. Accordingly, adverse influence of unintentional capacitive coupling on, for example, image signals to be supplied to the data lines can be suppressed. Consequently, deterioration of image quality can be suppressed.

In the electro-optical device according to the first aspect of the invention, it is preferable that the constant-potential wire have at least a portion thereof overlapping the extending portion in plan view of the substrate.

In this case, since the constant-potential wire and the extending portion are electrically connected to each other, there is no need to separately provide wires or the like for making connection therebetween. This reduces the size of the electro-optical device and enables relatively easy establishment of electrical connection between the constant-potential wire and the extending portion, providing a great advantage in practical use.

The electro-optical device according to the first aspect of the invention further includes dummy wires provided in a region of the peripheral area in such a manner as to be interposed between adjacent ones of the data lines, the dummy wires being obtained from a same film as the data lines. Further, it is preferable that the constant-potential wire be provided in an upper layer relative to the data lines with a first insulating film interposed therebetween and be electrically connected to the dummy wires via first contact holes provided in the first insulating film. Furthermore, it is preferable that the extending portion be provided in a lower layer relative to the data lines with a second insulating film interposed therebetween and be electrically connected to the dummy wires via second contact holes provided in the second insulating film.

In this case, the dummy wires are provided in a region of the peripheral area in such a manner as to be interposed between the data lines. The dummy wires are obtained from the same film as the data lines, that is, the dummy wires are provided in a layer having the data lines. Thus, the leakage of light from regions between the data lines can be suppressed and therefore deterioration of image quality can be suppressed. The "same film" implies that the dummy wires and the data lines are composed of the same conductive material and are formed simultaneously in respective patterns.

According to a second aspect of the invention, an electronic apparatus includes the electro-optical device according to the first aspect of the invention (including the preferable configurations thereof).

Since the electronic apparatus according to the second aspect of the invention includes the electro-optical device according to the first aspect of the invention, the electronic apparatus can suppress the occurrence of unintentional capacitive coupling. Consequently, various electronic apparatuses capable of displaying high-quality images can be provided, such as a projection display apparatus, a mobile phone, an electronic organizer, a word processor, a viewfinder-type or monitor-direct-view-type videotape recorder, a workstation, a videophone, a point-of-sale (POS) terminal, and other apparatuses having touch panels.

Other features and advantages of the invention will become apparent from the following description of exemplary embodiments.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
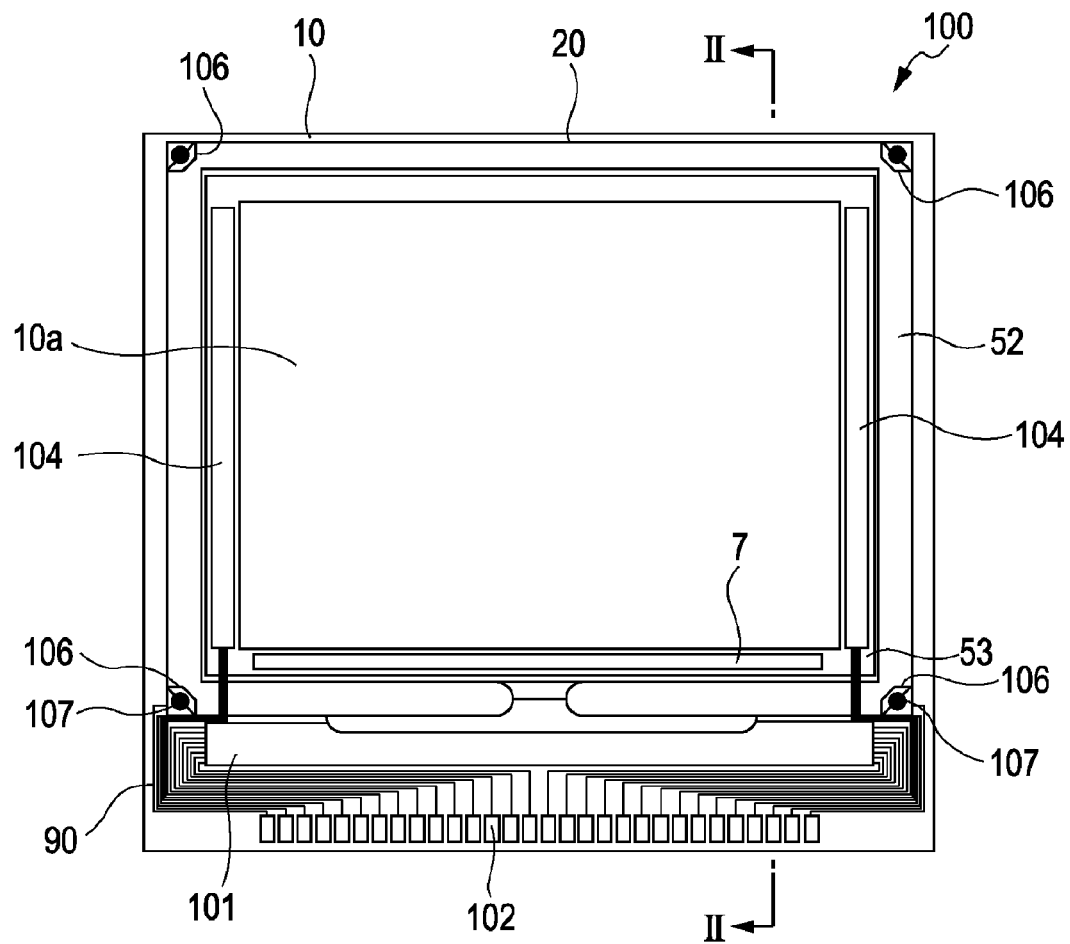
FIG. 1 is a plan view of a liquid crystal device according to an embodiment of the invention, showing an element substrate and relevant elements provided thereon, seen from a side of a counter substrate.

Embodiments of the electro-optical device and the electronic apparatus according to the invention will now be described with reference to FIGS. 1 to 6. Relevant layers and members shown in the drawings are not to scale for easier recognition. The embodiments will be described taking an active-matrix liquid crystal device including a drive circuit, as an exemplary electro-optical device.

Electro-Optical Device

Figure 2:
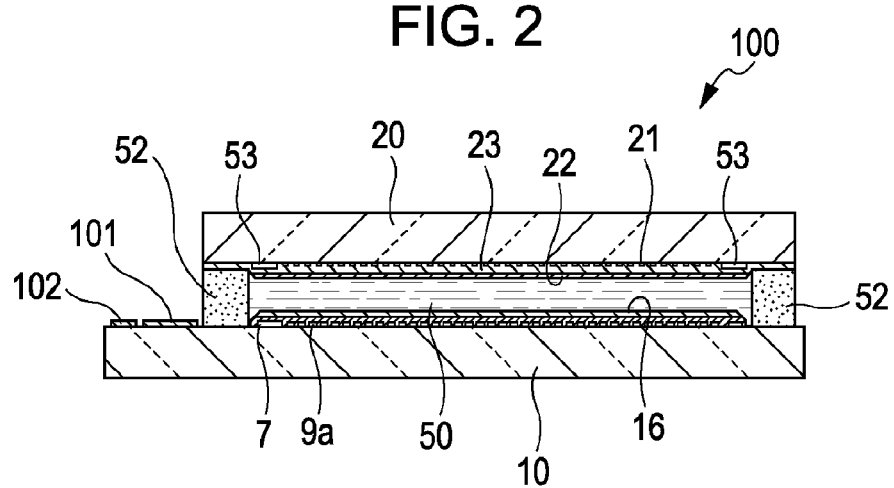
FIG. 2 is a cross-sectional view taken along the line II-II in FIG. 1.

First, the overall configuration of a liquid crystal device according to an embodiment of the invention will be described with reference to FIGS. 1 and 2. FIG. 1 is a plan view showing an element substrate and relevant elements provided thereon, seen from a side of a counter substrate. FIG. 2 is a cross-sectional view taken along the line II-II in FIG. 1.

Referring to FIGS. 1 and 2, a liquid crystal panel 100 of the liquid crystal device according to the embodiment includes an element substrate 10 and a counter substrate 20 facing each other. The element substrate 10 is any of a quartz substrate, a glass substrate, a silicon substrate, and the like. The counter substrate 20 is any of a quartz substrate, a glass substrate, and the like. The element substrate 10 and the counter substrate 20 in combination hold a liquid crystal layer 50 therebetween by being bonded to each other with a sealant 52 provided in a sealing area surrounding an image display area 10a.

The sealant 52 is composed of a material for bonding the substrates 10 and 20 together, such as ultraviolet curable resin, thermosetting resin, or ultraviolet-heat curable resin. In a manufacturing process, the sealant 52 is applied to the element substrate 10 and is then cured with ultraviolet, heat, or the like applied thereto. The sealant 52 contains gap materials, such as glass fibers or glass beads, that are dispersed therein so as to control the interval, i.e., the gap, between the element substrate 10 and the counter substrate 20 to be a predetermined length. In addition to or in replacement of mixing the gap materials in the sealant 52, gap materials may be provided in the image display area 10a or in a peripheral area surrounding the image display area 10a.

Referring to FIG. 1, a light-shielding film frame 53 that defines the image display area 10a is provided on the counter substrate 20, along the inner periphery of the sealing area having the sealant 52. Part of or the entirety of the light-shielding film frame 53 may be provided as an internal light-shielding film in the element substrate 10.

A data line driving circuit 101 and external circuit connection terminals 102 are provided in a portion, along one side of the element substrate 10, of the peripheral area outside the sealing area having the sealant 52. A sampling circuit 7 is provided on an inner side of the sealing area along the one side of the element substrate 10 in such a manner as to be covered with the light-shielding film frame 53. Scanning line driving circuits 104 are provided in regions of a frame area, inside the sealing area, along two sides connected to the one side of the element substrate 10 in such a manner as to be covered with the light-shielding film frame 53.

The element substrate 10 is provided with vertical conduction terminals 106 at positions facing four corners of the counter substrate 20. The vertical conduction terminals 106 in combination with vertical conductors 107 connect the element substrate 10 and the counter substrate 20, thereby providing electrical conduction therebetween. The element substrate 10 is also provided with routing wires 90 that electrically connect the external circuit connection terminals 102 to the data line driving circuit 101, the scanning line driving circuits 104, the vertical conduction terminals 106, and so forth.

Referring to FIG. 2, the element substrate 10 has thereon a layered structure in which pixel-switching transistors, as driving elements, and wires including scanning lines and data lines are provided in respective layers. Although details of the configuration of the layered structure are omitted in FIG. 2, island-shaped pixel electrodes 9a composed of a transparent material, such as indium tin oxide (ITO), are provided on the layered structure in a predetermined pattern in correspondence with pixels.

The pixel electrodes 9a are provided in the image display area 10a on the element substrate 10 in such a manner as to face a counter electrode 21, which will be described separately below. A surface of the element substrate 10 near the liquid crystal layer 50, i.e., the surface including the pixel electrodes 9a, is covered with an alignment film 16.

A surface of the counter substrate 20 near the element substrate 10 is provided with a light-shielding film 23. The light-shielding film 23 is provided in a matrix pattern, for example, in plan view seen in a direction perpendicular to the surface of the counter substrate 20. Regions of the counter substrate 20 covered with the light-shielding film 23 are defined as non-open regions. Regions of the counter substrate 20 not covered with the light-shielding film 23 are defined as open regions that allow light emitted from a lamp of a projector or a backlight of a direct-view apparatus, for example, to be transmitted therethrough. Alternatively, the light-shielding film 23 may be provided in a stripe pattern. In such a case, non-open regions may be defined by utilizing, in combination with the light-shielding film 23, various elements provided on the element substrate 10, including the data lines.

The counter electrode 21 composed of a transparent material such as ITO is provided over the light-shielding film 23 in such a manner as to face the pixel electrodes 9a. To realize color display in the image display area 10a, color filters (not shown in FIG. 2) may also be provided over the light-shielding film 23 in regions overlapping the respective open regions and part of the non-open regions therearound. The counter electrode 21 provided on the surface of the counter substrate 20 near the element substrate 10 is covered with an alignment film 22.

The element substrate 10 shown in FIGS. 1 and 2 having the data line driving circuit 101, the scanning line driving circuits 104, the sampling circuit 7, and so forth may also have the following: a precharge circuit that supplies precharge signals of predetermined voltage levels to the respective data lines prior to image signals, an inspection circuit that inspects the quality, defects, or the like of the liquid crystal device in the manufacturing process or at the time of shipment, and so forth.

Figure 3:
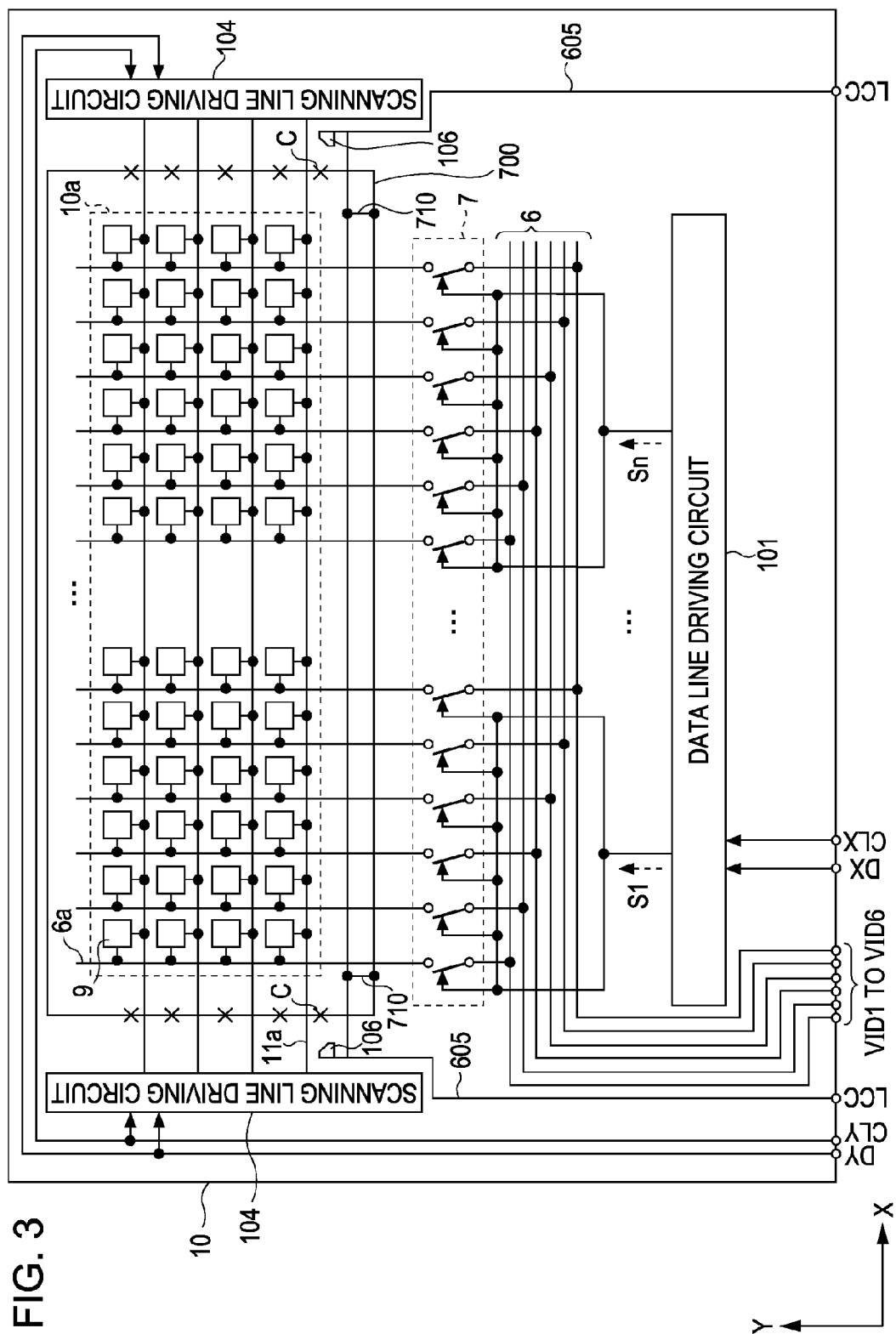
FIG. 3 is a block diagram schematically showing the electrical configuration of the liquid crystal device according to the embodiment of the invention.

Next, the electrical configuration of the liquid crystal device according to the embodiment will be described with reference to FIG. 3. FIG. 3 is a block diagram schematically showing the electrical configuration of the liquid crystal device according to the embodiment.

Referring to FIG. 3, a plurality of scanning lines 11a and a plurality of data lines 6a are provided in the image display area 10a on the element substrate 10 in such a manner as to intersect each other. Pixel units 9, which correspond to the pixels, are provided at respective intersections of the scanning lines 11a and the data lines 6a, thereby forming a matrix pattern. The pixel units 9 are each electrically connected to one of the scanning lines 11a and one of the data lines 6a. Basically, the pixel units 9 each include a pixel-switching transistor for selectively supplying an image signal supplied via the data line 6a, and a pixel electrode 9a (see FIG. 2) serving, in combination with the counter electrode 21 (see FIG. 2), as a liquid crystal retention capacitor that supplies the image signal that has been input thereto to the liquid crystal layer 50 (see FIG. 2) and retains the image signal in the liquid crystal layer 50. To prevent the leakage of the image signal retained in the liquid crystal retention capacitor, the pixel unit 9 may also include a storage capacitor provided in parallel with the liquid crystal retention capacitor.

Referring to FIG. 3, the element substrate 10 has in the peripheral area thereof the data line driving circuit 101, the sampling circuit 7, and the scanning line driving circuits 104. In addition, a short-circuit wire 700 lies in the peripheral area. In the process of manufacturing the liquid crystal panel 100, the short-circuit wire 700 temporarily short-circuits the scanning lines 11a from each other, but is subsequently cut at required positions C, for example, when the data lines 6a or the like are formed. Thus, the electrical connections between the short-circuit wire 700 and the scanning lines 11a are cut.

In the embodiment, portions of the short-circuit wire 700 extending along the left and right sides, in FIG. 3, of the element substrate 10 (i.e., in a Y direction) are each an example of the "main portion" according to the invention, and a portion of the short-circuit wire 700 extending along the lower side, in FIG. 3, of the element substrate 10 is an example of the "extending portion" according to the invention.

The scanning line driving circuits 104 are supplied with a Y clock signal CLY (and an inverse Y clock signal CLYinv obtained by inversing the Y clock signal CLY) and a Y start pulse DY from an external circuit (not shown) or the like via corresponding ones of the external circuit connection terminals 102 (see FIG. 1). When the Y start pulse DY is input to the scanning line driving circuits 104, the scanning line driving circuits 104 generate scanning signals sequentially with timings based on the Y clock signal CLY and the inverse Y clock signal CLYinv and output the scanning signals to the respective scanning lines 11a.

The data line driving circuit 101 is supplied with an X clock signal CLX (and an inverse X clock signal CLXinv obtained by inversing the X clock signal CLX) and an X start pulse DX from the external circuit via corresponding ones of the external circuit connection terminals 102. When the X start pulse DX is input to the data line driving circuit 101, the data line driving circuit 101 generates sampling signals S1, . . . , Sn sequentially with timings based on the X clock signal CLX and the inverse X clock signal CLXinv and output the sampling signals S1, . . . , Sn to respective sampling signal lines.

The sampling circuit 7 includes switching elements (i.e., sampling switches) provided in correspondence with the data lines 6a so as to select appropriate ones of the data lines 6a to be supplied with the image signals from six image signal lines 6. The timing of switching the switching elements is controlled in accordance with the sampling signals S1, . . . , Sn supplied from the data line driving circuit 101.

The sampling circuit 7 is supplied with image signals VID1 to VID6 obtained by serial-parallel conversion into six phases, i.e., six-phase expansion, performed by the external circuit, via the six image signal lines 6. The six image signal lines 6 are routed from corresponding ones of the external circuit connection terminals 102, around the data line driving circuit 101, and extend in a direction in which the data lines 6a are arranged (i.e., in an X direction).

The number of phases into which the image signal is expanded (i.e., the number of lines for serial-parallel expansion of the image signal) is not limited to six, and may be nine, twelve, twenty-four, forty-eight, ninety-six, and so forth.

The timing signals including the clock signals CLX and CLY are generated by a timing generator included in the external circuit (not shown) or the like, and are supplied via the corresponding external circuit connection terminals 102 to the circuits provided on the element substrate 10. Power, for example, required for driving the driving circuits is also supplied from the external circuit or the like.

The element substrate 10 has in the peripheral area thereof a counter-electrode-potential wire 605, which is an example of the "constant-potential wire" according to the invention, via which a counter-electrode potential LCC is supplied from the external circuit or the like. The counter-electrode-potential wire 605 is routed from one of the external circuit connection terminals 102 to one of the vertical conduction terminals 106, extends therefrom to another vertical conduction terminal 106 in the direction in which the data lines 6a are arranged (i.e., in the X direction), and is routed therefrom to another external circuit connection terminal 102.

Thus, the counter-electrode potential LCC is supplied via the two vertical conduction terminals 106 and corresponding ones of the vertical conductors 107 (see FIG. 1) to the counter electrode 21. The counter-electrode potential LCC is regarded as a reference potential of the counter electrode 21. With the counter-electrode potential LCC, the potential differences between the counter electrode 21 and the pixel electrodes 9a are appropriately retained, whereby the liquid crystal retention capacitors are obtained. In the embodiment, a 1H inversion driving method is employed. The image signals VID1 to VID6 are inverted in a predetermined cycle between positive polarity, exhibiting a potential higher than the counter-electrode potential LCC, and negative polarity, exhibiting a potential lower than the counter-electrode potential LCC. More specifically, when display of one frame is performed, the image signals VID1 to VID6 are supplied with a positive potential, with reference to the counter-electrode potential LCC, to the pixel units 9 arranged in odd lines, and with a negative potential, with reference to the counter-electrode potential LCC, to the pixel units 9 arranged in even lines. Conversely, when display of a subsequent frame is performed, the image signals VID1 to VID6 are supplied with a positive potential to the pixel units 9 arranged in the even lines, and with a negative potential to the pixel units 9 arranged in the odd lines. That is, the potential polarities of the image signals VID1 to VID6 are inverted in such a manner that the pixel units 9 arranged in the same line are supplied with potentials of the same polarity, while the pixel units 9 arranged in different lines adjacent to each other are supplied with potentials of different polarities, and such polarities of the potentials supplied to the respective lines are inverted for each frame cycle.

A major feature of the embodiment is that a portion of the short-circuit wire 700 extending along the lower side, in FIG. 3, of the element substrate 10 is electrically connected to the counter-electrode-potential wire 605 via, for example, contact holes 710. This determines the potential of the short-circuit wire 700, whereby the occurrence of unintentional capacitive coupling can be suppressed. Accordingly, nonuniformity between lines can be suppressed, and therefore deterioration of image quality can also be suppressed.

Figure 4:
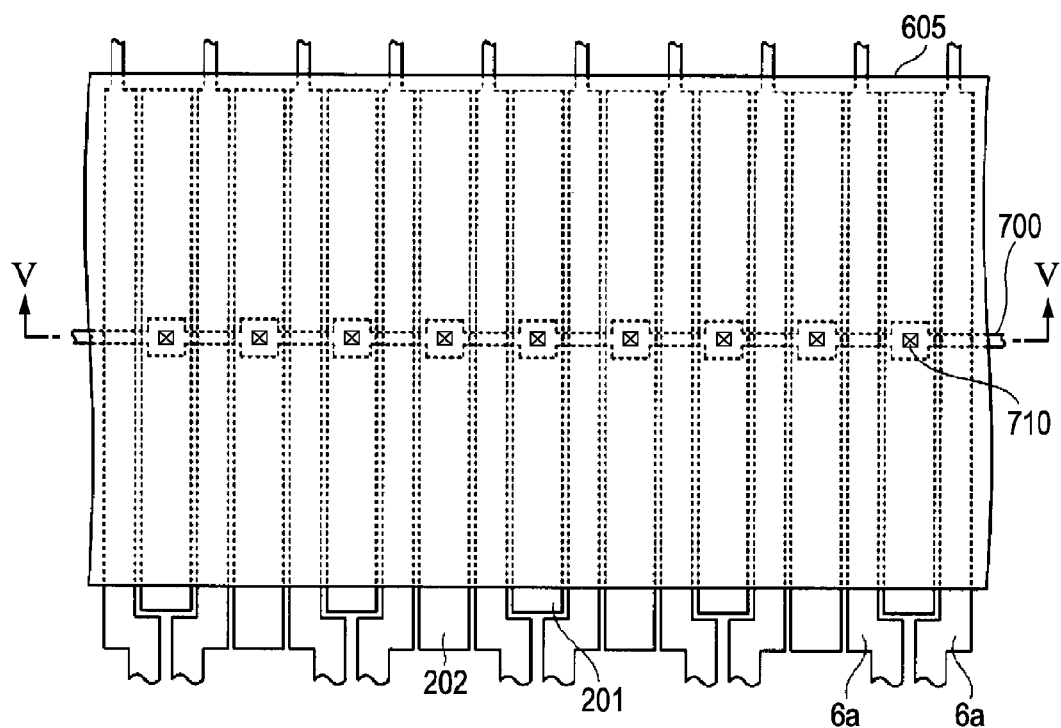
FIG. 4 is a plan view showing data lines, a short-circuit wire, and a counter-electrode potential line seen from the side of the counter substrate.
Figure 5:
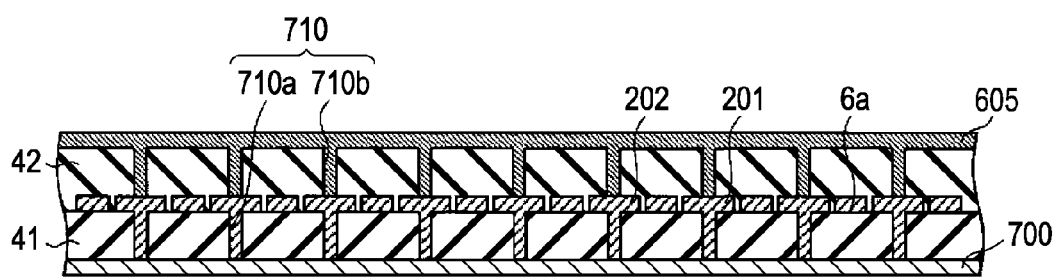
FIG. 5 is a cross-sectional view taken along the line V-V in FIG. 4.

Next, the positional relationship between the data lines 6a, the short-circuit wire 700, and the counter-electrode-potential wire 605 will be specifically described with reference to FIGS. 4 and 5. FIG. 4 is a plan view showing the data lines 6a, the short-circuit wire 700, and the counter-electrode-potential wire 605 seen from the side of the counter substrate 20. FIG. 5 is a cross-sectional view taken along the line V-V in FIG. 4. In FIG. 5, elements residing above the counter-electrode-potential wire 605 and elements residing below the short-circuit wire 700 are omitted.

Referring to FIG. 4, the counter-electrode-potential wire 605 spreads over the short-circuit wire 700 in plan view. In other words, the short-circuit wire 700 extends in a region where the counter-electrode-potential wire 605 spreads.

The data lines 6a each intersect the short-circuit wire 700. The data lines 6a are electrically connected at lower ends thereof in FIG. 4 to the sampling circuit 7 (see FIG. 3) and at upper ends thereof to the pixel units 9 (see FIG. 3). Dummy wires 201 and 202 are alternately provided between adjacent ones of the data lines 6a. The dummy wires 201 and 202 contribute to suppression of the leakage of light from regions between the data lines 6a. Thus, deterioration of image quality can be suppressed.

Referring to FIG. 5, a layer having the data lines 6a and the dummy wires 201 and 202 is held between a layer having the short-circuit wire 700 and a layer having the counter-electrode-potential wire 605.

The short-circuit wire 700 is composed of conductive polysilicon film and is formed simultaneously with, for example, the scanning lines 11a or gate electrodes provided in the image display area 10a, in respective patterns. The dummy wires 201 and 202 are composed of metal film or alloy film, such as aluminum film, or any light-shielding conductive film of other kinds, and are formed simultaneously with the data lines 6a provided in the image display area 10a, in respective patterns. The counter-electrode-potential wire 605 is composed of metal film or alloy film, such as aluminum film, or any light-shielding conductive film of other kinds, and is formed simultaneously with a shielding layer, in respective patterns. The shielding layer is provided between the data lines 6a and the pixel electrodes 9a in the image display region 10a, and is supplied with a predetermined potential.

An interlayer insulating film 41 is provided between the layer having the short-circuit wire 700 and the layer having the data lines 6a and so forth. An interlayer insulating film 42 is provided between the layer having the data lines 6a and so forth and the layer having the counter-electrode-potential wire 605. The interlayer insulating films 41 and 42 prevent the occurrence of short circuits between the foregoing elements. The interlayer insulating films 41 and 42 according to the embodiment are examples of the "second insulating film" and the "first insulating film", respectively, according to the invention.

Referring to FIG. 5, the counter-electrode-potential wire 605 is electrically connected to the short-circuit wire 700 via, in sequence, contact holes 710b provided in the interlayer insulating film 42, the dummy wires 201 or 202, and contact holes 710a provided in the interlayer insulating film 41.

Electronic Apparatus

Figure 6:
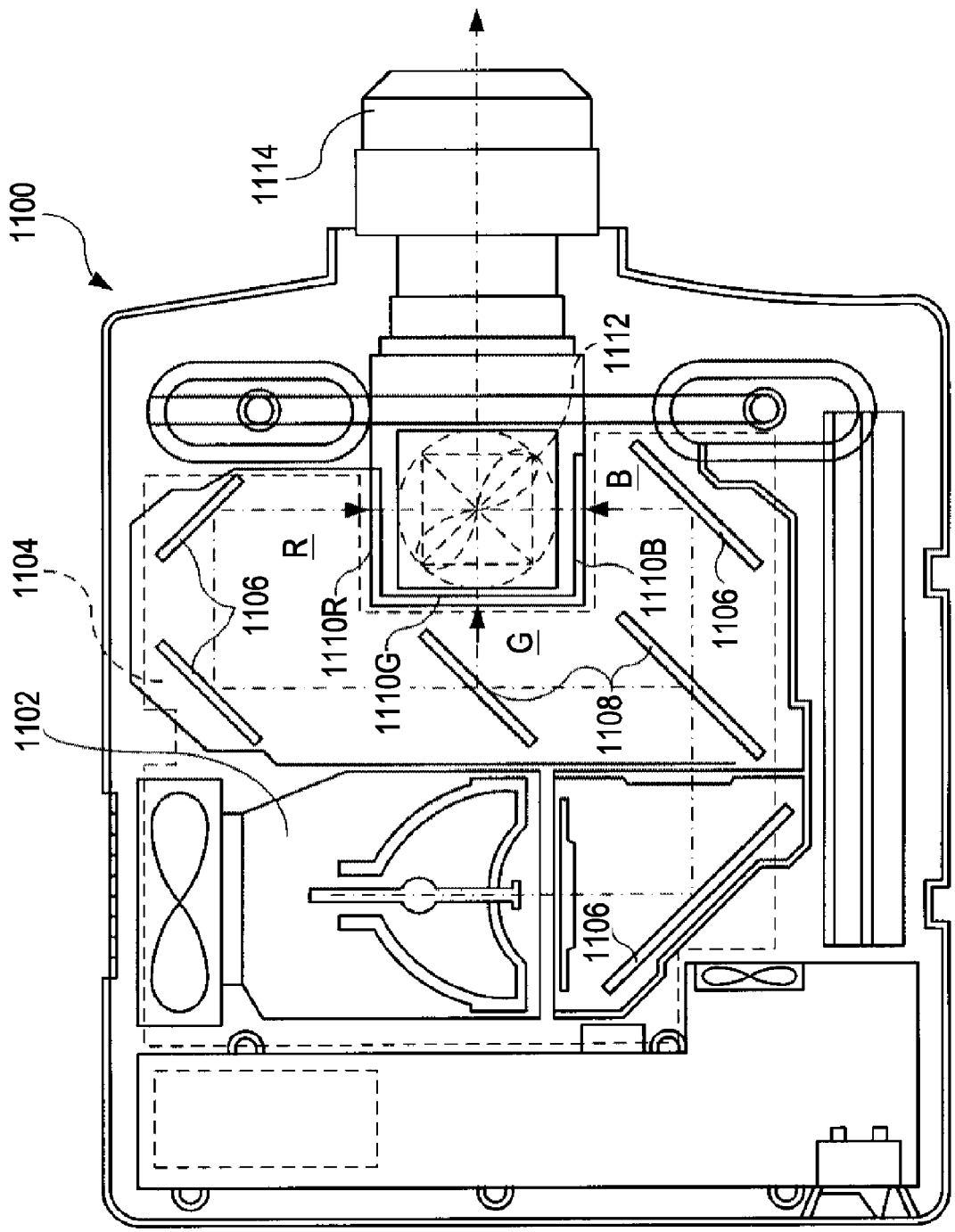
FIG. 6 is a plan view of a projector, as an exemplary electronic apparatus to which the electro-optical device is applied.

Next, another embodiment of the invention in which the liquid crystal device described above is applied to a projector, an example of an electronic apparatus, will be described with reference to FIG. 6. The liquid crystal panel 100 of the liquid crystal device described above is used as a light valve of the projector. FIG. 6 is a plan view showing an exemplary configuration of the projector.

Referring to FIG. 6, a projector 1100 has therein a lamp unit 1102 including a white-light source such as a halogen lamp. Light emitted from the lamp unit 1102 is split into rays of three primary colors of red (R), blue (B), and green (G) by four mirrors 1106 and two dichroic mirrors 1108 all provided in a light guide 1104. The split rays of light enter respective liquid crystal panels 1110R, 1110B, and 1110G serving as light valves for the respective colors.

The liquid crystal panels 1110R, 1110B, and 1110G each have substantially the same configuration as the liquid crystal device described above, and are driven in accordance with signals for the colors of R, B, and G, respectively, supplied from an image signal processing circuit. The rays of light modulated by the liquid crystal panels 1110R, 1110B, and 1110G enter a dichroic prism 1112 in three respective directions. The dichroic prism 1112 refracts the rays of R and B by 90 degrees but allows the ray of G to travel straight therethrough. Thus, monochrome images of the three respective colors are integrated, whereby a three-color image is projected through a projection lens 1114 onto a screen or the like.

Focusing on the respective images displayed by the liquid crystal panels 1110R, 1110B, and 1110G, the images displayed by the liquid crystal panels 1110R and 1110B need to be flipped horizontally with respect to the image displayed by the liquid crystal panel 1110G.

The liquid crystal panels 1110R, 1110B, and 1110G do not require color filters because the rays applied thereto already have the respective colors of R, B, and G with the aid of the dichroic mirrors 1108.

Examples of the electronic apparatus described with reference to FIG. 6 include a mobile personal computer, a mobile phone, a liquid crystal television, a viewfinder-type or monitor-direct-view-type videotape recorder, a car navigation system, a pager, an electronic organizer, a calculator, a word processor, a workstation, a videophone, a point-of-sale (POS) terminal, and other apparatuses having touch panels. Needless to say, the invention can be applied to any of the foregoing electronic apparatuses.

The invention is not limited to the embodiments described above, and changes can be appropriately made thereto without departing from the scope and idea of the invention that can be understood from the appended claims and the entirety of the specification. Electro-optical devices to which such changes have been made and electronic apparatuses having such electro-optical devices are also included in the technical scope of the invention.

What is claimed is:

1. An electro-optical device comprising:
a plurality of scanning lines;
a plurality of data lines intersecting the scanning lines;
a pixel area including a plurality of pixel electrodes provided in correspondence with intersections of the scanning lines and the data lines;
a peripheral area that surrounds the pixel area;
a short-circuit wire provided in the peripheral area, the short-circuit wire including a main portion that short-circuits the scanning lines with each other and an extending portion that extends from the main portion in such a manner as to intersect the data lines;
a wire located in the peripheral area and supplied with a predetermined potential, the wire being electrically connected to the extending portion; and
dummy wires provided in a region of the peripheral area in such a manner as to be interposed between adjacent ones of the data lines, the dummy wires being obtained from a same film as the data lines and being electrically connected to the wire and the short-circuit wire.

2. An electro-optical device comprising:
a plurality of scanning lines;
a plurality of data lines intersecting the scanning lines;
a pixel area including a plurality of pixel electrodes provided in correspondence with intersections of the scanning lines and the data lines;
a peripheral area that surrounds the pixel area;
dummy wires provided in a region of the peripheral area in such a manner as to be interposed between adjacent ones of the data lines, the dummy wires being obtained from a same film as the data lines;
a short-circuit wire provided in the peripheral area, the short-circuit wire including a main portion that short-circuits the scanning lines with each other and an extending portion that extends from the main portion in such a manner as to intersect the data lines; and
a wire located in the peripheral area and supplied with a predetermined potential, the wire being electrically connected to the extending portion,
wherein the wire is provided in an upper layer relative to the data lines with a first insulating film interposed there between, the wire being electrically connected to the dummy wires via first contact holes provided in the first insulating film, and
wherein the extending portion is provided in a lower layer relative to the data lines with a second insulating film interposed there between, the extending portion being electrically connected to the dummy wires via second contact holes provided in the second insulating film.

3. The electro-optical device according to claim 2, wherein the wire has at least a portion thereof overlapping the extending portion in plan view of the substrate.

4. An electronic apparatus comprising the electro-optical device according to claim 2.

* * * * *